United States Patent [19]

Alvord et al.

[11] Patent Number: 5,668,359
[45] Date of Patent: Sep. 16, 1997

[54] MULTIPLE SWITCH ASSEMBLY INCLUDING SPRING BIASED ROTARY CAM WITH CONCENTRIC CAM TRACKS FOR SELECTIVELY OPERATING SWITCHES

[75] Inventors: Robert J. Alvord, Elmwood Park; Jeffrey M. Huffington, Cary; Yoshio W. Kano, Barrington; Joseph S. Calabrese, Arlington Heights, all of Ill.; Kayvan K. Mirza, Annecy, France

[73] Assignee: Eaton Corporation, Cleveland, Ohio

[21] Appl. No.: 609,204

[22] Filed: Mar. 1, 1996

[51] Int. Cl.[6] .......................... H01H 19/60; H01H 21/80
[52] U.S. Cl. ........................... 200/6 B; 200/573; 200/18
[58] Field of Search ...................... 200/6 B, 6 BA, 200/6 BB, 6 C, 5 R, 573, 574, 38 R–38 CA, 17 R, 18; 74/567, 568, 569

[56] References Cited

U.S. PATENT DOCUMENTS

| | | |
|---|---|---|
| 3,071,658 | 1/1963 | Demarest .................. 200/6 B X |
| 3,189,763 | 6/1965 | Chown ..................... 200/574 X |
| 3,566,051 | 2/1971 | Hulterstrum et al. ......... 200/38 C |
| 3,639,707 | 2/1972 | Takano ................... 200/38 CA X |
| 3,657,493 | 4/1972 | Horsley .................... 200/6 B |
| 4,052,578 | 10/1977 | Hoke ...................... 200/18 X |
| 4,272,658 | 6/1981 | Crosby .................... 200/6 B |
| 4,444,284 | 4/1984 | Montemurro ............... 200/6 B X |
| 4,814,556 | 3/1989 | Cole ...................... 200/38 R |

*Primary Examiner*—J. R. Scott
*Attorney, Agent, or Firm*—Roger A. Johnston

[57] ABSTRACT

A rotary encoded switch having a plurality of stationary discrete micro switches operated by a rotor having a plurality of concentric cam tracks. The cam tracks and switches are disposed such that for each rotary position of the rotor at least two switches, on opposite sides of the rotor are actuated and a discrete combination of switches is actuated for each position of the rotor. The number of microswitches required is less than half the number of rotary positions.

9 Claims, 3 Drawing Sheets

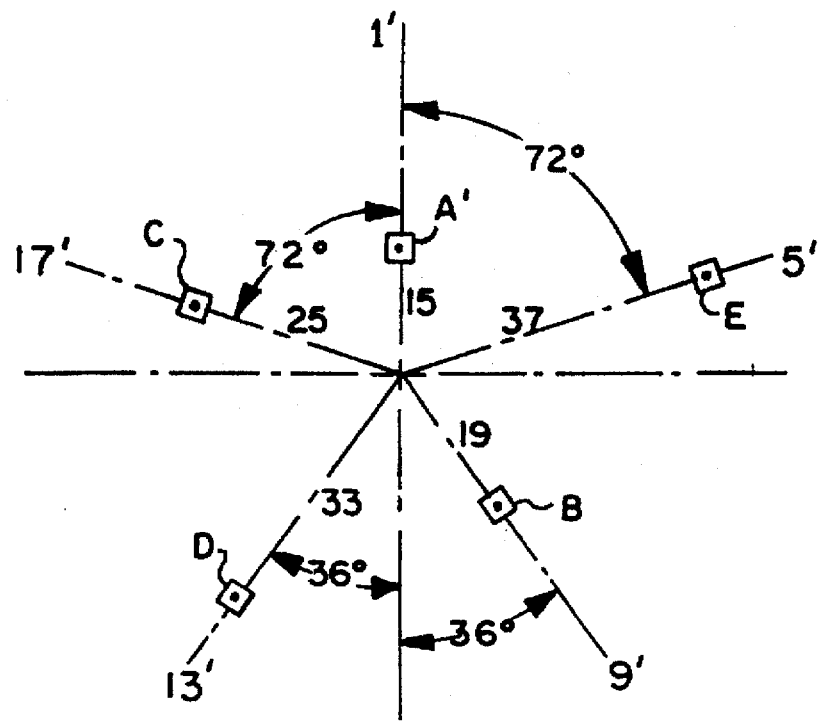
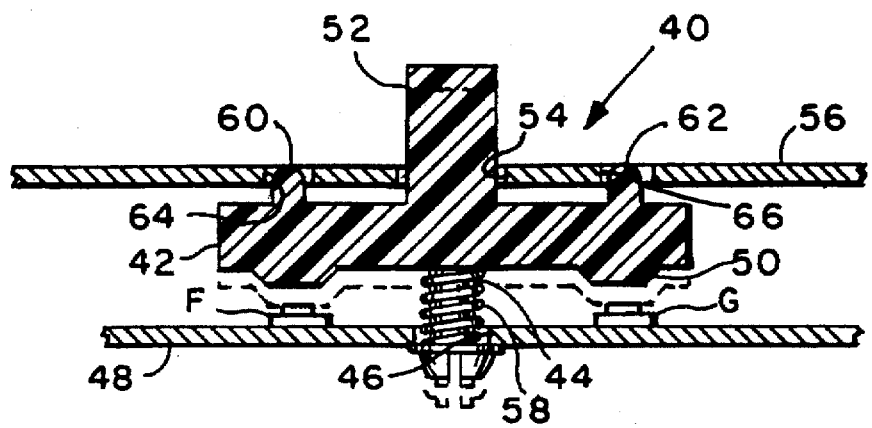

MULTIPLE SWITCH ASSEMBLY INCLUDING SPRING BIASED ROTARY CAM WITH CONCENTRIC CAM TRACKS FOR SELECTIVELY OPERATING SWITCHES

BACKGROUND OF THE INVENTION

The present invention relates to rotary switches and particularly to rotary switches employed for program selection for the operating cycle of appliances such as washing machines and dishwashers. In appliances such as washing machines and dishwashers manufactured for the household market, the use of a rotary knob or dial for selecting the desired machine program or cycle has found widespread user acceptance and renders the appliance operation quite simple. Additionally, a push-to-start or push-to-turn function of the rotary control knob has also found widespread user acceptance in such household appliances. These features have their origin in appliances which utilized an electromechanical programmer timer, particularly a programmer timer employing a plurality of switches actuated by a rotary advanced program cam. Typically, such electromechanical programmer timers employed a rotary cam advanced through one full revolution for the complete machine cycle; and, the user rotates the cam to a desired position for selecting the desired portion of the complete machine cycle.

However, with the advent of relatively low cost microprocessors it has been desired to provide electronic control of appliances such as washing machines and dishwashers and to eliminate the time based electromechanical programmer timer. However, it has also been desired to retain the rotary knob type program selection and to also retain the push-to-start feature of the user control knob. Such an arrangement of a rotary user control providing inputs to an electronic controller without a plurality of cam actuated switches has proven to be difficult due to the problem of providing a discrete electrical signal for a particular position of the rotary control knob such that the controller can determine the particular selected rotary position of the knob. Where numerous discrete positions of the rotary user control knob are desired, it is prohibitive to provide an individual switch for each position and thus, it has long been desired to find a way or means of providing such a discrete electrical indication without requiring an individual switch for each position.

SUMMARY OF THE INVENTION

The present invention provides a rotary encoded switch assembly having a plurality of user selectable rotary positions each of which actuates at least two discrete switches disposed on opposite sides of the rotor center. The number of switches required is less than half of the number of user selectable rotary positions, yet the assembly provides discrete electrical signals for each selected rotary position.

The present invention provides a rotor having a plurality of circumferential cam tracks disposed on the axial face of the rotor for actuating individual switches disposed in a pattern on the switch housing or base.

The rotary encoded switch assembly of the present invention provides for push-to-turn in one embodiment or push-to-start in a second embodiment such that the rotor can be axially moved to disengage the cams tracks for free rotation of the rotor by the user. In the disclosed embodiment, the rotor has twenty user selectable positions yet employs only five switches to give discrete electrical signal generation for any selected position of the rotor and actuates at least two oppositely disposed switches in each position.

BRIEF DESCRIPTION OF THE DRAWINGS

FIG. 5 is a dimensional layout for the switch locations of the arrangement of FIG. 3; and, FIG. 6 is a cross-section of another embodiment of the switch assembly of the present invention.

DETAILED DESCRIPTION

Figure 1:
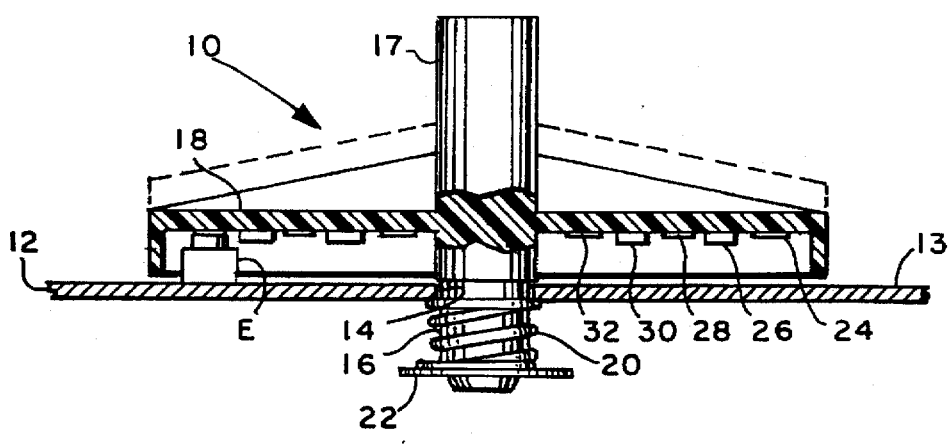
FIG. 1 is a cross-section of a first embodiment of the switch assembly of the present invention.

Referring to FIG. 1, the switch assembly of the present invention is indicated generally at 10 and includes a base or housing 12 which may comprise a portion of the control console of an appliance and which includes a printed circuit board (not shown) in the presently preferred practice but which is on deck surface 13 of housing 12. Housing 12 has an aperture 14 formed therein in which is journalled for rotation a portion of a shaft 16 which forms a part of a rotor 18. Rotor 18 has a shaft portion 17 coaxial with the portion 16; and, portion 17 extends in the opposite direction and is adapted for having a user control knob (not shown) attached thereto. Shaft portion 16 extends through the housing 12 and has a compression spring 20 received thereover which registers against a washer 22 retained on the end of shaft portion 16 so as to bias the rotor 18 in a direction toward base 12. With reference to FIG. 1, the at-rest position of the rotor 18 as shown in solid outline and the upward position as effected by the user pulling on the knob end 17 of the shaft is shown in dashed outline.

Figure 4:
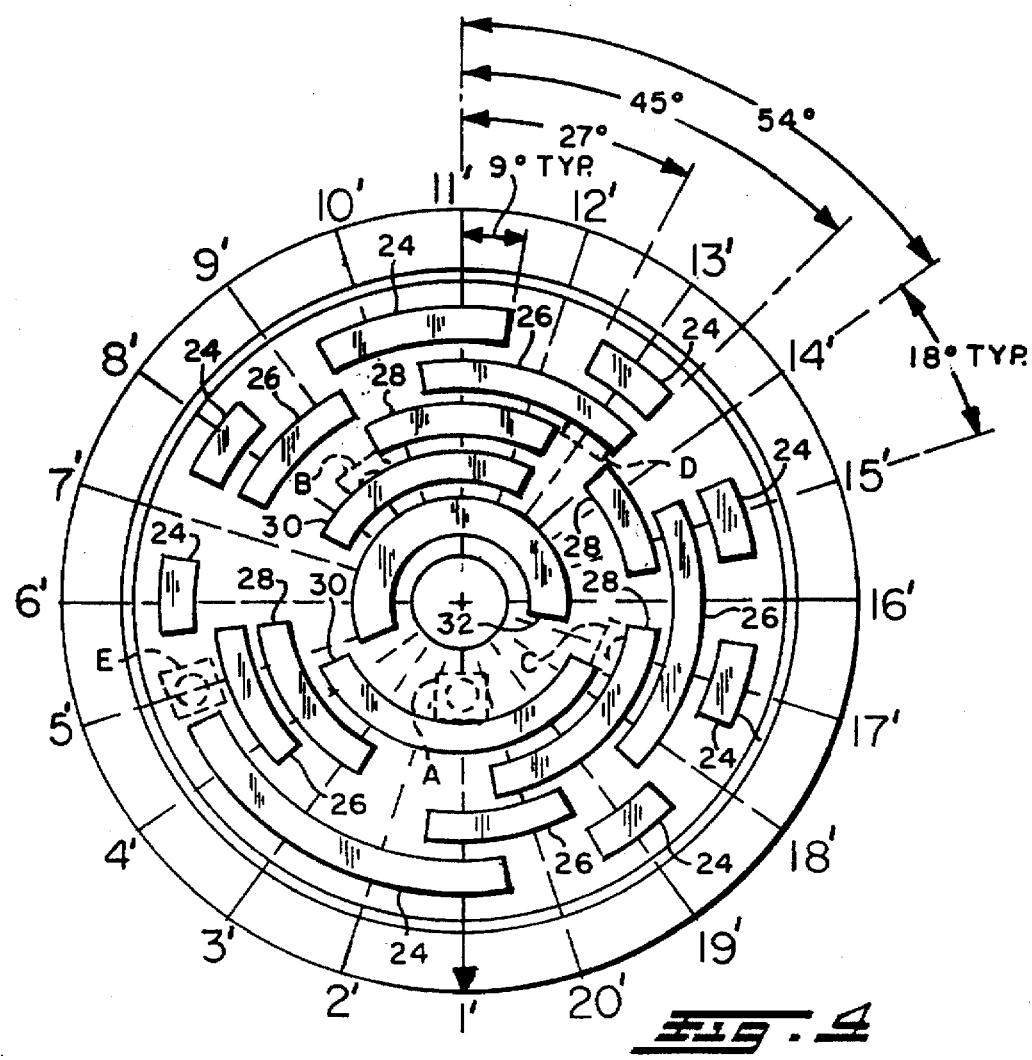
FIG. 4 is a detail of the layout of the cam tracks for the rotor of FIG. 2.
Figure 2:
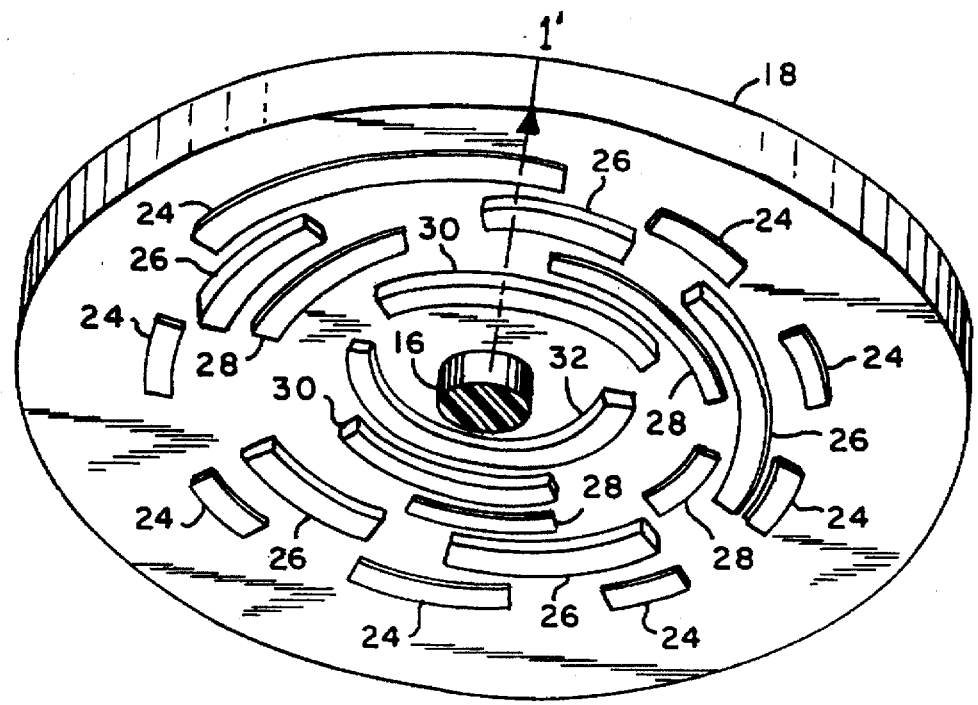
FIG. 2 is a perspective view of the rotor cam tracks of the assembly of FIG. 1.
Figure 3:
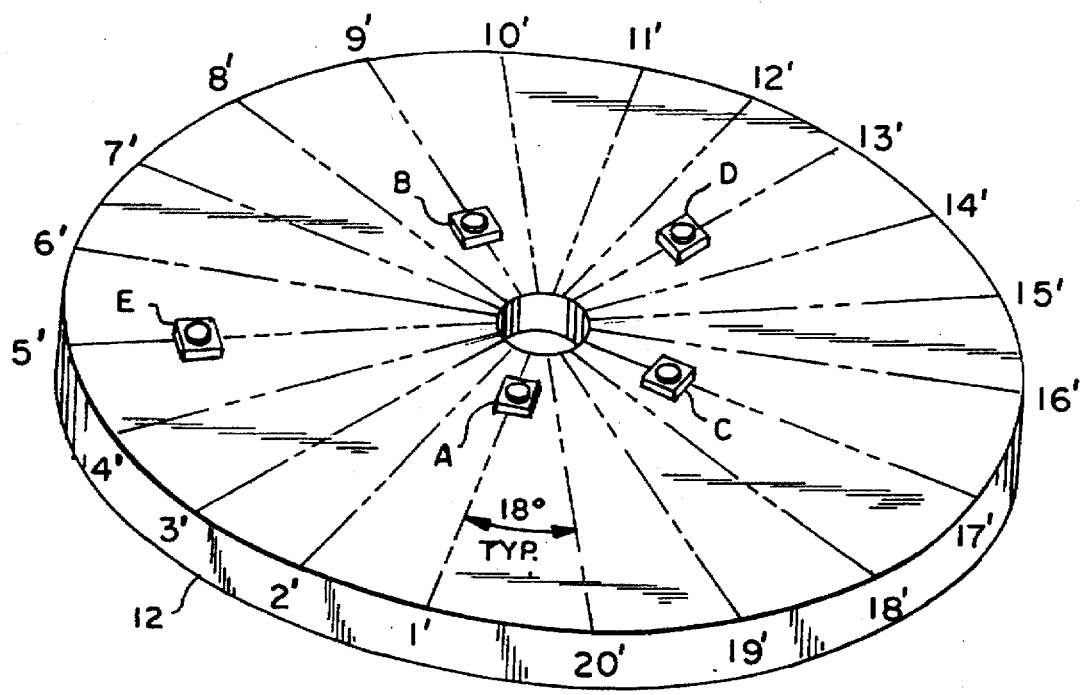
FIG. 3 is a perspective view of the arrangement of the switches for the cam track of FIG. 2.

Referring to FIGS. 2, 3 and 4, a plurality of cams arranged in five concentric tracks denoted by reference numerals 24, 26, 28, 30, 32 in FIGS. 1, 2 and 4 are disposed on the undersurface of the rotor 18. Referring to FIG. 4, the layout of the cam tracks 24 through 32 is shown in crosshatching where the arcuate portions of each track denoted by the crosshatching are raised surface projections or arcuately disposed lobes.

In the embodiment of FIG. 1, rotor 18 has the cam tracks 24 through 32 configured for 20 equally spaced positions of the rotor 18 as denoted by the reference numbers 1' through 20' disposed about the circumference of the rotor in FIG. 4.

Referring to FIGS. 3 and 5, a portion of the base 12 is illustrated with the 20 equally spaced positions 1' through 20' indicated thereon in dashed line at 18 degrees arcuate spacing with each of the five switches A, B, C, D, E disposed thereon at the 1', 5', 9', 13', 17' arcuate locations. In the present practice of the invention, if only 16 rotary positions are used, only four switches need be employed. The relative radial unit locations are denoted for each of the switches A through E in FIG. 5 it being understood that these radial locations each correspond respectively with one of the cam tracks (24 through 32). With reference to FIG. 1, switch E is shown as being engaged by the outer cam track 24 when the rotor 18 is in the downward position.

Referring to TABLE I, the truth table for the actuation of switches A through E by the cam tracks 24 through 32 is shown for each rotary position 1' through 20' of the rotor 18. From TABLE I it will be seen that for each of the rotary positions 1' through 20' at least two of the switches A, B, C, D, E are actuated with no repetition for the combinations of switches actuated; and, two of the switches actuated are always on opposite sides with respect to the center of rotor 18. This arrangement provides for reliable actuation of at least one of the switches disposed on opposite side of the rotor in the event that the rotor is misaligned or wobbles due to excess play in its mounting or dimensional inaccuracy in the manufacture of the rotor and cam tracks or due to differences in the position of the actuators for the switches.

TABLE I

| POSITION | SWITCH | | | | |
|---|---|---|---|---|---|
| | A | B | C | D | E |
| 1' | | | | | ■ |
| 2' | | | | ■ | ■ |
| 3' | | ■ | | ■ | ■ |
| 4' | | ■ | | | ■ |
| 5' | | ■ | | | |
| 6' | | ■ | ■ | | |
| 7' | | ■ | ■ | | ■ |
| 8' | | | ■ | | ■ |
| 9' | ■ | | ■ | | ■ |
| 10' | ■ | | ■ | | |
| 11' | ■ | | ■ | ■ | |
| 12' | ■ | | | ■ | |
| 13' | ■ | | | ■ | ■ |
| 14' | ■ | ■ | | ■ | ■ |
| 15' | ■ | ■ | | | ■ |
| 16' | ■ | ■ | ■ | | ■ |
| 17' | ■ | ■ | ■ | | |
| 18' | | ■ | ■ | ■ | |
| 19' | | | ■ | ■ | |
| 20' | | | | ■ | |

Referring to FIG. 6, another embodiment of the invention indicated generally at 40 is illustrated as having a rotor 42 with a shaft portion 44 extending downwardly therefrom and journalled through an aperture 46 formed in a base forming a part of the appliance to be controlled. The plurality of switches F, G, are disposed in a spaced arrangement on the surface of base 48 for actuation by cam track 50 formed on the undersurface of rotor 42. Rotor 42 has a shaft portion 52 which extends upwardly through a clearance aperture 54 formed in a control panel 56 spaced from base 48 and which forms a part of the appliance to be controlled. Shaft portion 52 is adapted for having a user control knob (not shown) engaged thereon. A compression spring 58 received over shaft portion 44 biases the rotor in an upward direction. The rotor also has a plurality of diametrally opposed lugs or projections 60, 62 extending upwardly therefrom which engage correspondingly located aperture 64, 66 provided in the panel and correspondingly located about the center of the shaft 52. The embodiment of FIG. 6 thus provides a push-to-turn function for rotor 42 upon the user effecting downward movement of the shaft 52 to cause the rotor 42 to move to the position shown in dashed outline in FIG. 6. It will be understood that when the rotor is moved to the position shown in dashed outline the lugs 60, 62 slidably register against the under surface of panel 56 and hold the rotor in position so as to effect actuation of switches such as the switches F, G by the cam track 50. It will be understood that FIG. 6 has been simplified for purposes of illustration and that the arrangement of the cam tracks on the undersurface of rotor 42 may include additional tracks other than track 50 and additional switches and may be arranged in the same pattern as the embodiment of FIG. 1 if so desired.

The present invention thus provides a rotary encoded switch having at least two switches disposed on opposite sides of the rotor center actuated at each selected position of rotation with the number of switches comprising less than half the number of rotary positions and provides a discrete combination of switches for each selected position so as to provide an electrical signal identifying the selected rotary position.

Although the invention has hereinabove been described with respect to the illustrated embodiments, it will be understood that the invention is capable of modification and variation and is limited only by the scope of the following claims.

We claim:

1. A rotary encoded switch assembly comprising:

(a) a housing defining a deck surface;

(b) a rotor mounted for rotation on said housing about an axis generally orthogonal or normal to said deck surface, said rotor defining a plurality of switch actuating surfaces radially and arcuately spaced about said axis in a predetermined arrangement;

(c) a plurality of individual switches disposed on said deck surface in a predetermined pattern each having a moveable actuator member, wherein one revolution of said rotor represents a plurality of functions of a desired program and wherein one revolution is subdivided into at least 16 increments of rotation with each said increment actuating selected ones of said switches to provide a discrete binary code for each incremental position of said rotor, said selected ones comprising at least two of said switches, and said plurality of switches comprises less than one-half the number of said increments.

2. The assembly defined in claim 1, wherein said rotor rotation is subdivided into 20 increments of rotation and said plurality of switches comprises five switches.

3. The assembly defined in claim 1, wherein said rotor is moveable in a direction generally parallel to said axis between a position disengaging said actuating surfaces and a position enabling engagement of said actuating surfaces with said switches.

4. The assembly defined in claim 1, wherein said plurality of switches comprises five microswitches circumferentially spaced.

5. The assembly defined in claim 1, wherein said rotor comprises a disc having a plurality of cam tracks formed integrally on an axial face thereof; and, said switches each comprise a preassembled closed microswitch.

6. The assembly defined in claim 1, wherein said rotor includes a plurality of face cam tracks and is moveable in the direction of the axis of rotation for a push-to-turn function.

7. The assembly defined in claim 1, wherein said rotor is axially moveable and includes a plurality of concentric cam tracks and an axially extending peripheral stop for limiting said axial movement of said rotor.

8. The assembly defined in claim 1, wherein said housing includes a control indicator panel with said rotor having portions thereof extending through said panel for user actuation thereof; and, said rotor includes other portions thereof operable, upon axial movement of said rotor, to be engaged and disengaged form said panel for permitting and preventing rotation of said rotor.

9. The assembly defined in claim 1, wherein said rotor is axially moveable; and, said switches are disposed for push-to-start functions by said axial movement of said rotor.

* * * * *